(12) United States Patent
Petschauer et al.

(10) Patent No.: US 7,090,746 B2
(45) Date of Patent: Aug. 15, 2006

(54) PROCESS AND DEVICE FOR REMOVING WATER FROM A MECHANICAL PULP, CHEMICAL PULP OR PAPER SHEET

(75) Inventors: Franz Petschauer, Lannach (AT); Karl Hornhofer, St. Radegund (AT); Thomas Kefer, Graz (AT); Dietmar Hausjell, Graz (AT); Edgar Brogyanyi, Graz-Stattegg (AT); Reinhard Diemat, Kumberg (AT)

(73) Assignee: Andritz AG, Graz (AT)

( * ) Notice: Subject to any disclaimer, the term of this patent is extended or adjusted under 35 U.S.C. 154(b) by 0 days.

(21) Appl. No.: 10/113,412

(22) Filed: Apr. 1, 2002

(65) Prior Publication Data

US 2003/0183355 A1 Oct. 2, 2003

(51) Int. Cl.
*D21F 1/00* (2006.01)

(52) U.S. Cl. .............. 162/300; 162/203; 162/348; 162/336; 162/344; 162/363; 162/264; 162/301; 162/217

(58) Field of Classification Search .......... 162/203, 162/300, 348, 336, 344, 363, 364, 367, 264, 162/301, 217, 374
See application file for complete search history.

(56) References Cited

U.S. PATENT DOCUMENTS

| 1,645,068 A | * | 10/1927 | O'Brien | 162/301 |
| 2,881,676 A | * | 4/1959 | Thomas | 162/203 |
| 3,847,731 A | * | 11/1974 | Arledter | 162/203 |
| 4,472,733 A | * | 9/1984 | Bolger | 348/618 |
| 5,389,207 A | * | 2/1995 | Rodriguez et al. | 162/363 |
| 5,833,809 A | * | 11/1998 | Odell | 162/203 |

* cited by examiner

*Primary Examiner*—Mark Halpern
(74) *Attorney, Agent, or Firm*—Alix, Yale & Ristas, LLP (57) ABSTRACT

A process and apparatus for removing water from a mechanical pulp, chemical pulp or paper sheet, carried between top and bottom wires running through a dewatering machine having a first dewatering zone. The apparatus includes at least one suction box positioned downstream of the first dewatering zone. The process includes generating an air current in at least one of the wires downstream of the first dewatering zone with the suction box. The air current removes water from the wire and directs it into an inner chamber of the suction box. The invention also refers to a device for implementing the process.

4 Claims, 7 Drawing Sheets

PROCESS AND DEVICE FOR REMOVING WATER FROM A MECHANICAL PULP, CHEMICAL PULP OR PAPER SHEET

BACKGROUND OF THE INVENTION

This invention relates generally to a process for removing water from a mechanical pulp, chemical pulp or paper sheet. More particularly, the present invention relates to a process for removing such water in a first zone, where the mechanical pulp, chemical pulp or paper sheet runs, for example, between two wires in a dewatering machine and is dewatered advantageously in a wedge zone, i.e. a sector in which the two wires converge in a wedge shape. In addition, the invention refers to a device for implementing the process.

A device of this kind is known, for example, from WO 00/77298, where initial dewatering takes place in a gravity zone and further dewatering in a twin-wire zone. This is followed by dewatering in further zones. A device for dewatering purposes is shown here at the top wire where the water from the wire is directed as a so-called free jet into a dewatering box and drained off from there. Only the water collecting on the wire (surface of the wire) is carried off here. A large quantity of water, however, remains in the wire, which later causes re-wetting of the mechanical pulp, chemical pulp or paper sheet.

SUMMARY OF THE INVENTION

The aim of the invention is thus to remove also a substantial quantity of the water from the wire (wires) economically and boost the overall dewatering performance of the pulp dewatering machine (plant).

The invention is thus characterized by the water at the end of the first dewatering zone or adjoining it being removed from at least one wire by a vacuum, where the water is directed to the inner chamber of a suction box by the air current generated in the wire. As a result, re-wetting of the mechanical pulp, chemical pulp or paper sheet to be dewatered can be greatly reduced.

An advantageous further development of the invention is characterized by water being extracted simultaneously from the top and bottom wire. This guarantees favorable, even and rapid dewatering of the mechanical pulp, chemical pulp or paper sheet.

A favorable configuration of the invention is characterized by the water being extracted immediately after the wedge zone. If the water is extracted directly after the wedge zone, dewatering performance can be further enhanced as there is no re-wetting in the meantime.

A favorable further development of the invention is characterized by the air flowing through the wire in the opposite direction to that in which the wire is running. As a result, a larger quantity of water can be extracted from the wire.

An advantageous configuration of the invention is characterized by several suction points being located one behind the other on a wire. In this way it is possible to achieve maximum possible dewatering of the wire and thus, largely prevent any re-wetting of the mechanical pulp, chemical pulp or paper sheet to be dewatered.

The invention also refers to a device for removing water from a mechanical pulp, chemical pulp or paper sheet, running, for example, between two wires in a dewatering machine, where it is an advantage if the first dewatering zone is designed as a wedge zone, i.e. a sector in which both wires converge in a wedge shape, characterized by at least one suction box, connected to a vacuum source and with suction opening facing the wire, being provided immediately following the first dewatering zone, which is preferably a wedge zone. As a result, re-wetting of the mechanical pulp, chemical pulp or paper sheet can be greatly reduced.

An advantageous further development of the invention is characterized by the suction opening of the suction box resting directly on the wire. Thus, misrouted currents can be avoided and removal of moisture from the wire (wires) substantially improved.

A favorable configuration of the invention is characterized by at least one suction box being located immediately after the wedge zone. If the water is extracted directly after the wedge zone, the dewatering capacity can be increased even further as there is no re-wetting whatsoever in the meantime.

A favorable further development of the invention is characterized by at least one suction box each being mounted at the top and bottom wire. This guarantees favorable, even and rapid dewatering of the mechanical pulp, chemical pulp or paper sheet.

An advantageous configuration of the invention is characterized by several suction boxes being mounted one after the other on one wire. This achieves maximum possible dewatering and largely prevents re-wetting of the mechanical pulp, chemical pulp or paper sheet.

An advantageous further development of the invention is characterized by the suction opening having a duct mounted diagonally and directed against the wire running direction.

BRIEF DESCRIPTION OF THE DRAWINGS

The present invention may be better understood and its numerous objects and advantages will become apparent to those skilled in the art by reference to the accompanying drawings in which:

FIG. 9 is an enlarged view of a portion of the twin-wire dewatering machine of FIG. 8.

DETAILED DESCRIPTION OF THE PREFERRED EMBODIMENT

Figure 1:
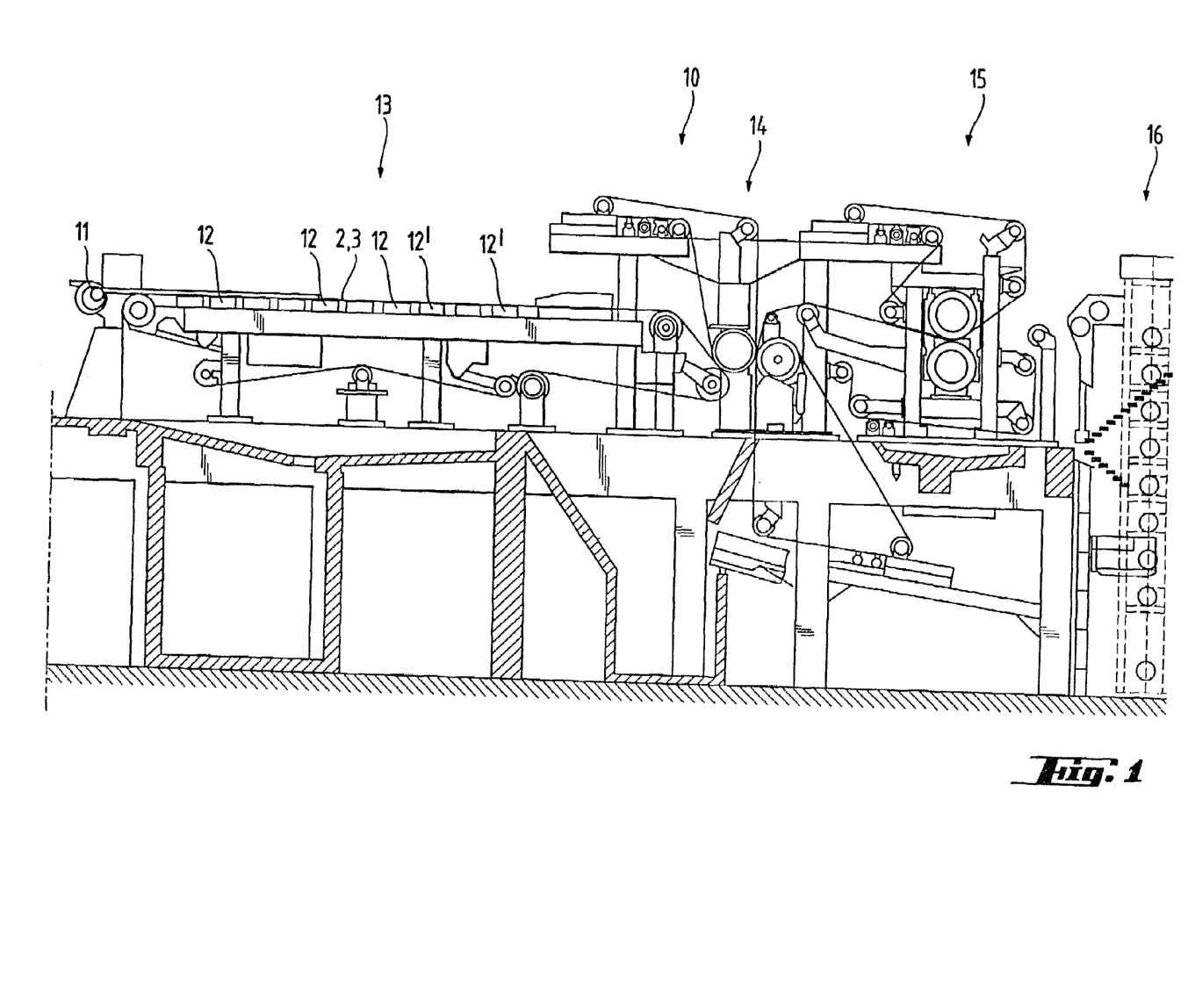
FIG. 1 is a schematic view of a dewatering machine.

FIG. 1 shows a complete dewatering machine 10 in the form of a Fourdrinier machine. The material to be dewatered is spread on the wire 3 through a headbox 11 at a consistency of 0.4–2.5% and subsequently forms a sheet of mechanical pulp, chemical pulp or paper 2, which is to be dewatered and dried as far as possible. In order to remove the water, suction boxes 12, 12' are mounted under the wire 3. The invention is inserted at the end of the first dewatering zone 13, designed for gravity dewatering. A press section 14 with at least one suction press roll adjoins this dewatering zone 13. Mechanical dewatering is concluded with a high-pressure dewatering press 15. The dryness here is approximately 55–57% for a pulp sheet and approximately 40–45% for a paper sheet, which achieves an increase of 2 to 3 percentage points compared with a plant not using the invention. Mechanical dewatering is followed by thermal drying in a dryer 16.

Figure 2:
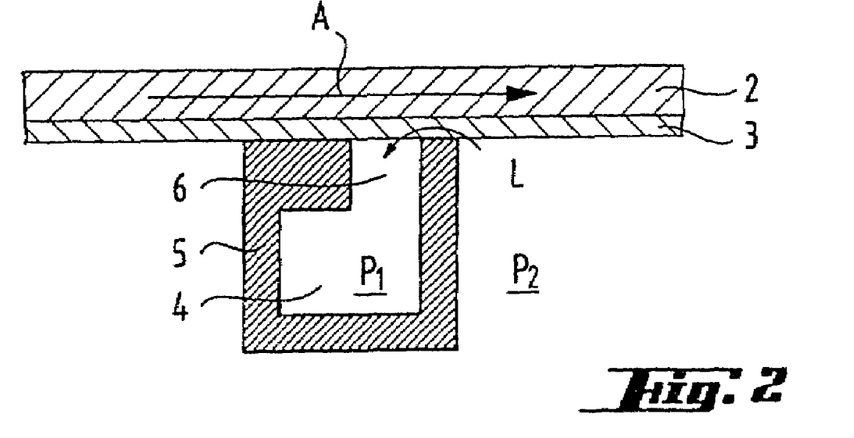
FIG. 2 is a schematic view of a first embodiment of the bottom suction box of FIG. 1.

FIG. 2 shows the arrangement of a suction box 5 at a wire 3 on which a mechanical pulp, chemical pulp or paper sheet 2 to be dewatered is transported. In addition, however, another wire (not shown) can run on the upper side of the mechanical pulp, chemical pulp or paper sheet 2, i.e. the mechanical pulp, chemical pulp or paper sheet 2 is carried between two wires 1, 3. In the suction chamber 4 of the suction box 5 a vacuum Pi, compared to the atmospheric pressure P2, is applied. Due to this vacuum P., air from outside is sucked through the wire 3 into the suction chamber 4 (arrow L) through a suction opening 6 resting on the wire 3. The air extracted also carries interstitial water from the wire 3. Here, it is an advantage if the air flows against the running direction A of the mechanical pulp, chemical pulp or paper sheet 2. If a suitable vacuum P1 is selected, the greater part of the water held in the wire 3 can be removed and discharged from the machine. As a result, re-wetting of the mechanical pulp, chemical pulp or paper sheet 2 can be greatly reduced.

Figure 3:
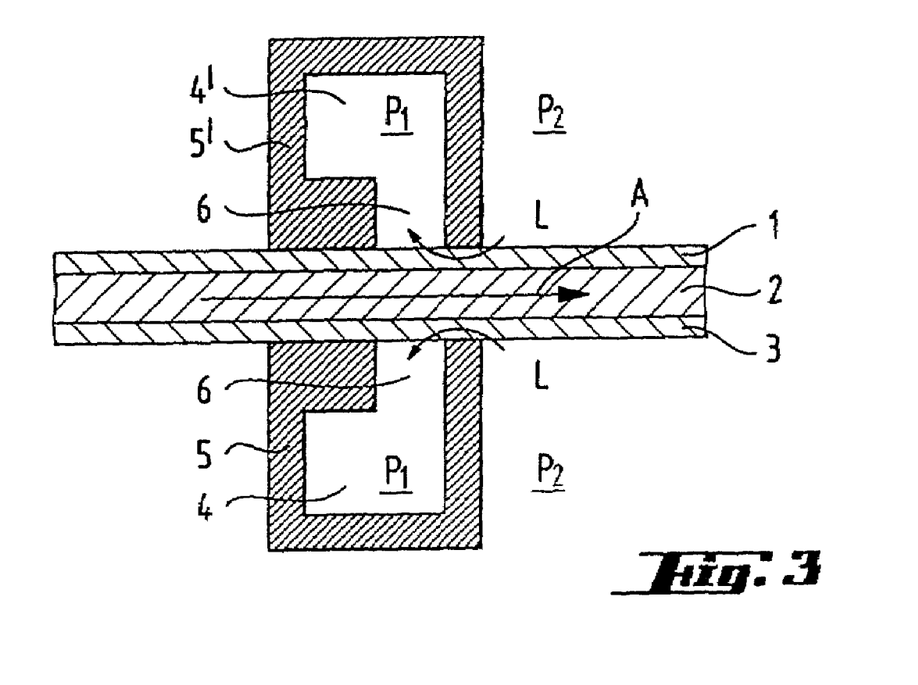
FIG. 3 is a schematic view of a combination of two bottom suction boxes, one mounted on top of the other.

FIG. 3 shows an arrangement of two opposing suction boxes 5, 5' in a twin-wire dewatering machine. Analogous to removal of water from the bottom wire 3 according to FIG. 2, the water is also removed here from the top wire 1. Here, too, the water contained in the wire 1 is sucked into the suction chamber 4' of the suction box 5' by the air current passing through the wire. As a result, a large part of the water contained in the top wire 1 can also be removed and re-wetting of the mechanical pulp, chemical pulp or paper sheet to be dewatered can be curtailed.

Figure 4:
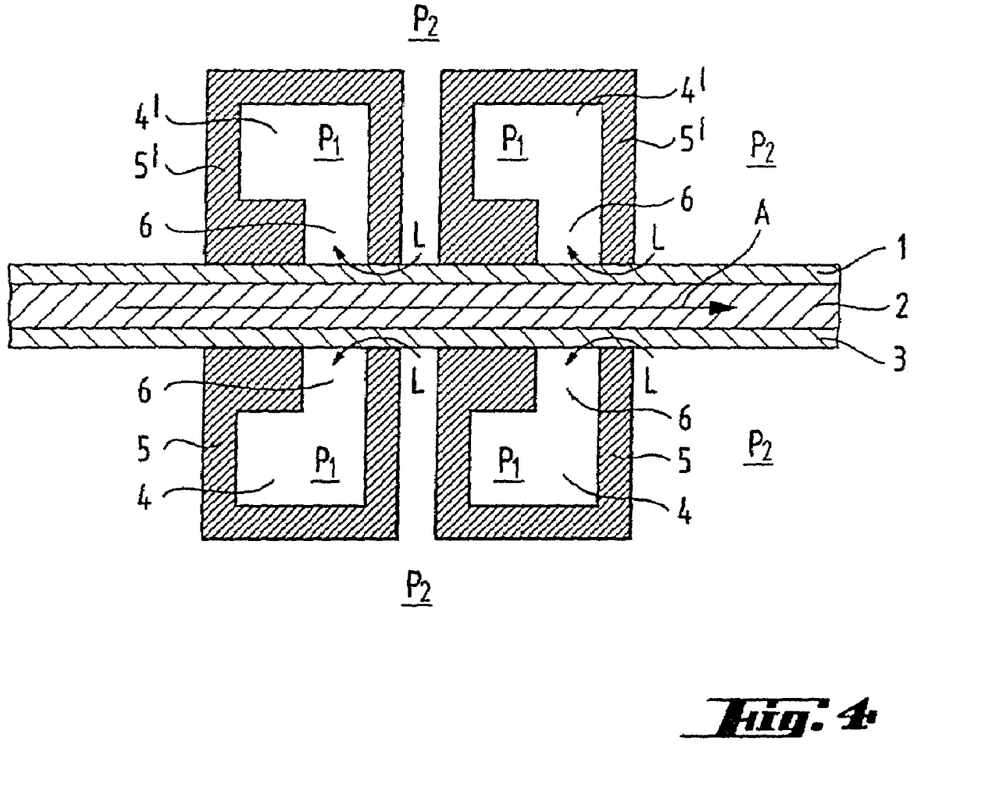
FIG. 4 is a schematic view of a combination of groups of two bottom suction boxes, mounted one behind the other.

In FIG. 4 there are two suction boxes 5, 5' mounted one behind the other at both the top wire 1 and the bottom wire 3. As a result, even more water can be removed from the wires.

As a basic principle, only two suction boxes can be used one behind the other at the top or bottom wire, offset against one another at the top and bottom wire, or three suction boxes where two are at the bottom wire and one at the top wire or vice versa. It is also possible to mount additional suction boxes one behind the other if required. In order to enhance water removal it would also be possible to apply different vacua, where it is an advantage to increase the vacuum in the running direction of the sheet.

Figure 5:
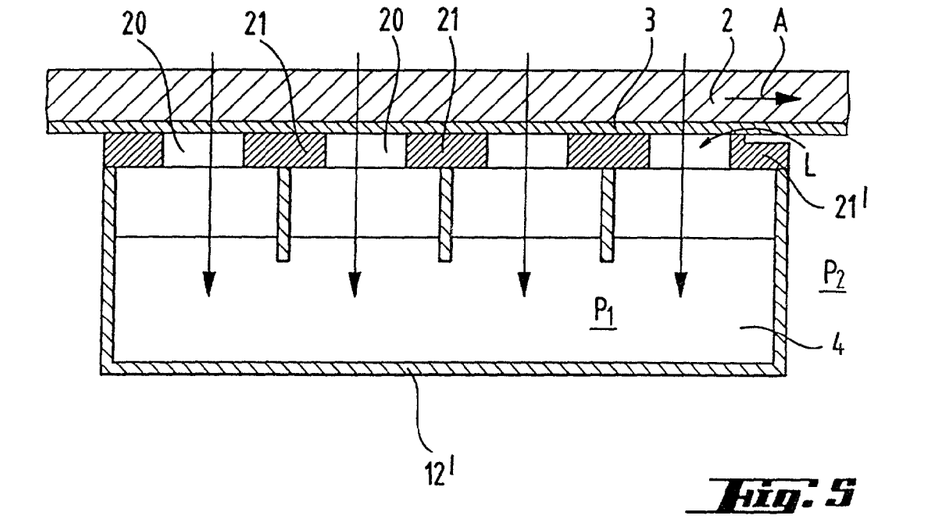
FIG. 5 is a schematic view of a second embodiment of a bottom suction box on a Fourdrinier wire.

FIG. 5 shows the layout at the end of a Fourdrinier machine, where the mechanical pulp, chemical pulp or paper sheet 2 is dewatered on a (bottom) wire 3. Here, a suction box 12' is shown, which extracts the water from the sheet 2 through several openings 20 into the suction chamber 4. During this process the wire runs on strips 21, the last of which 21' also serves to seal off the entire suction box against the surrounding area and is designed such that air L is sucked through the wire 3 into the suction chamber 4 and thus, carries a large part of the water contained in the wire 3 along with it. This has the effect of keeping subsequent re-wetting of the mechanical pulp, chemical pulp or paper sheet 2 by the water still contained in the wire 3 very low, thus the dewatering machine achieves a higher dryness overall at the end of the dewatering machine than machines that are currently state of the art.

Figure 6:
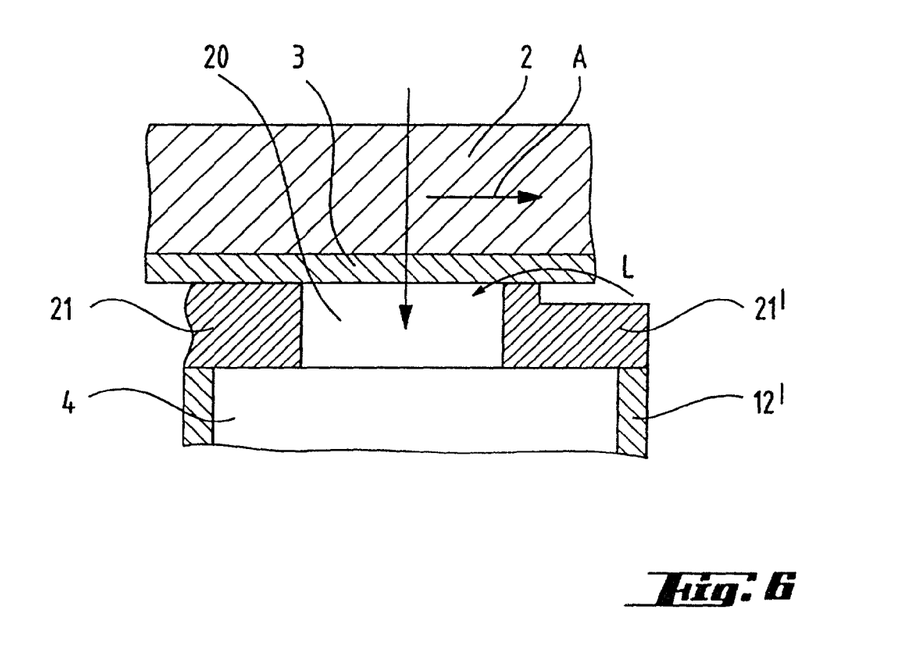
FIG. 6 is an enlarged view of a portion of the suction box of FIG. 5.

In FIG. 6 the situation at the end of the suction box 12' is illustrated once again in detail.

The vacuum applied in the suction box is up to 0.5 bar (50 kPa). A suction box on the bottom wire, for example, yields an increase in dryness at the end of the dewatering machine of approximately 2–3 percentage points. If two suction boxes opposite one another are used in a twin-wire press plant' the increase in dryness is roughly 3–4 percentage points. With two pairs of suction boxes, the dry content can be increased by 4–6 percentage points. If more suction boxes are used, it is possible to increase the dryness by up to 8 percentage points. The effect of the suction boxes is boosted at higher machine speeds, the usual speeds normally being between 150 and 250 m/min, however the effect of the suction boxes was excellent at least up to a sheet speed of 350 m/min. A maximum speed limit has not been determined to date, i.e. the suction device according to the invention can also be used at higher speeds.

Figure 7:
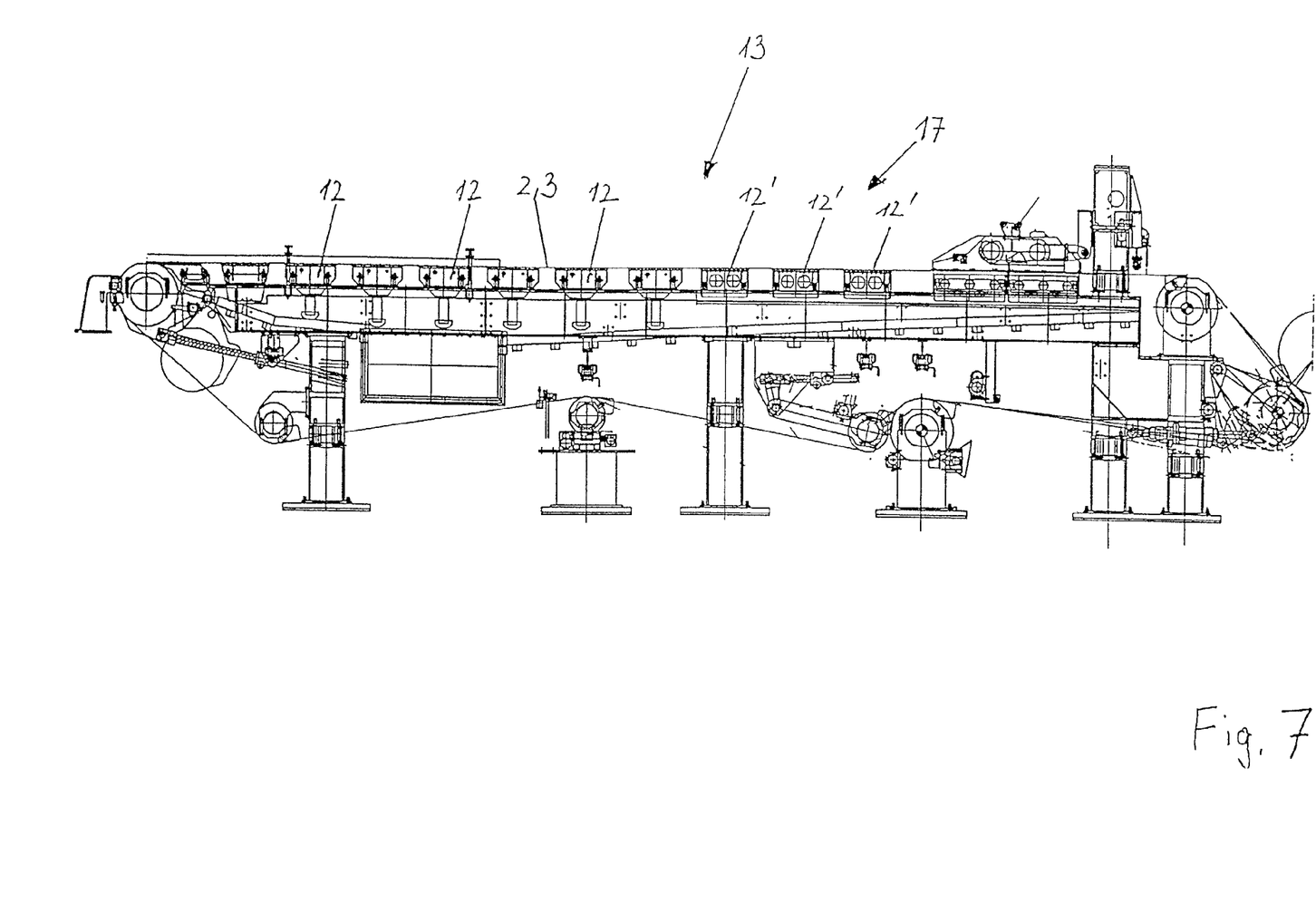
FIG. 7 is a schematic view of a Fourdrinier wire dewatering machine having the suction box of FIG. 5.

FIG. 7 once again shows the situation in a gravity dewatering zone 13 of a Fourdrinier machine 10, with the invention being applied in section 17, i.e. at the end of this zone 13. Here the last three suction boxes 12', for example, can be designed according to the invention.

Figure 8:
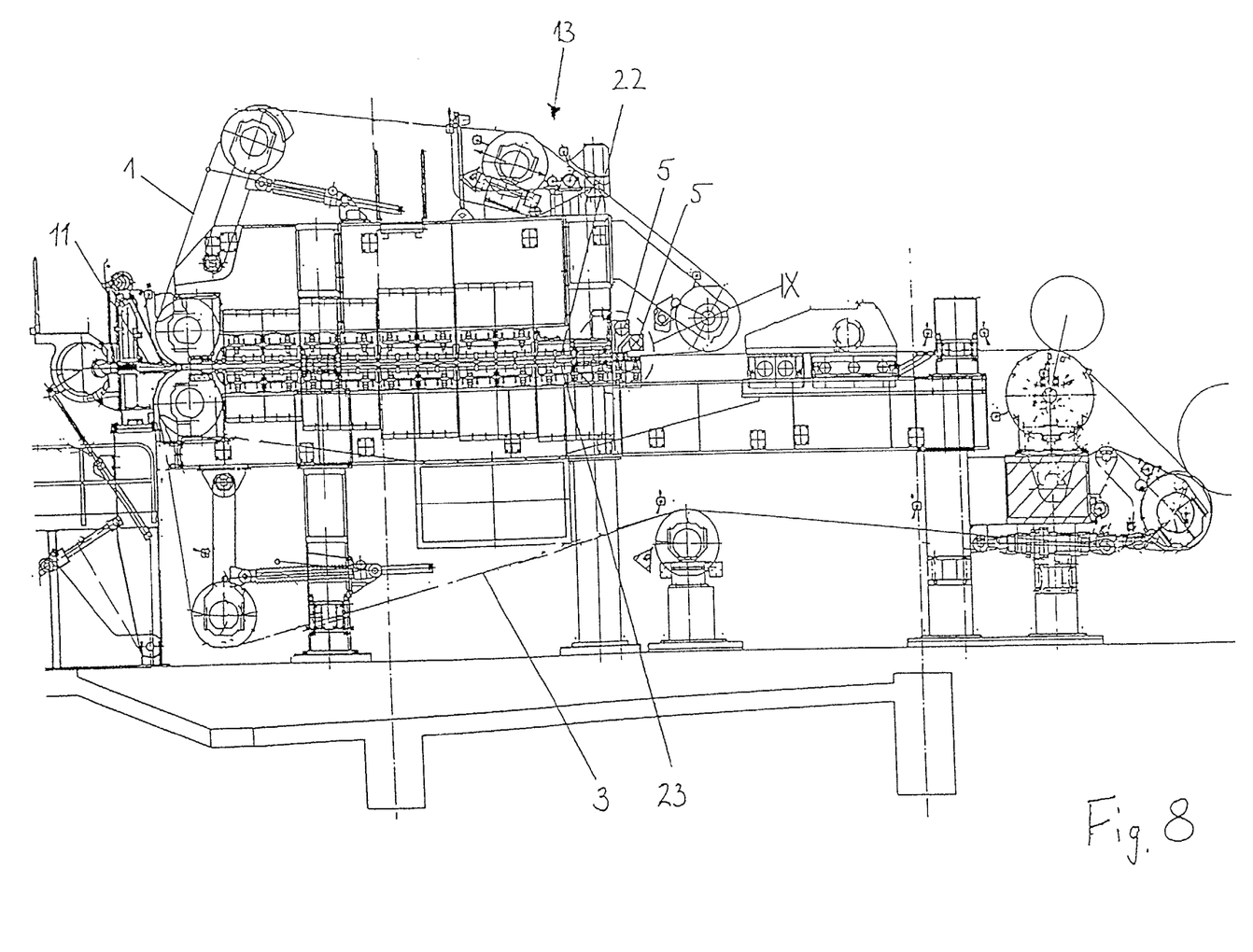
FIG. 8 is a schematic view of a twin-wire dewatering machine having the suction box of FIG. 5.

FIG. 8 shows a different type of dewatering zone 13, which has two wires, i.e. twin-wire dewatering. The advantage of this form is even dewatering of the mechanical pulp, chemical pulp or paper sheet 2, both upwards and downwards, which results not only in better quality, but also in higher production rates. This type of plant is used primarily in dewatering chemical pulp sheets as these are thicker and thus, have longer dewatering paths for the water they contain. Here, the material to be dewatered is fed in between the two wires 1, 3 through a headbox 11. The wires run over plates 22, 23 whose spacing from each other decreases in the running direction of the sheet, i.e. they converge in a wedge shape. As a result, increasing pressure is applied to the sheet 2, resulting in continual dewatering. The water drains off upwards and downwards through openings in the plates 22, 23. Additional suction boxes 5 are located at the end of this (wedge) zone. This illustration shows four suction boxes 5 mounted according to FIG. 4. The bottom suction boxes are covered by the remaining machine parts and thus, are not visible here.

FIG. 9 contains detail IX from FIG. 8 with the suction boxes 5. These suction boxes 5 are located directly adjacent to the first dewatering zone 13. The illustration shows the suction channels 24 that open onto the top wire 1 and are connected to the suction chamber 4 of the suction boxes 5. The air from the surrounding area is fed in here through an appropriate air inlet slot 25. At least one inlet duct located upstream of a suction opening at the last suction box 5, the air is sucked in through a slit 25'. The illustration also indicates that there are suction channels 24 and feed channels 25 at the bottom wire 3. Additional suction boxes 5 can easily be added later if necessary.

The invention is only described by means of examples and may also cover other designs of suction box in the claims, in particular other detailed designs.

What is claimed is:

1. A device for removing water from a mechanical pulp, chemical pulp or paper sheet comprising:

top and bottom wires converging in a wedge shape in a wire running direction and thereby defining a first dewatering zone having inlet and outlet ends;

a headbox disposed at the inlet end of the first dewatering zone for feeding the mechanical pulp between the top and bottom wires, chemical pulp or paper sheet between the top and bottom wires;

at least one suction box disposed at each of the top and bottom wires downstream of and proximate to the outlet end of the first dewatering zone, each suction box having a suction opening facing a one of the wires, the suction opening and the wire forming an inlet duct extending opposite to the wire running direction, at least one inlet duct located upstream of a suction opening; and a vacuum source in fluid communication with the suction box.

2. The device of claim 1 wherein the suction opening of the suction box is disposed on the wire.

3. The device of claim 1 wherein a plurality of suction boxes are disposed along the at least one wire.

4. A device for removing water from a mechanical pulp, chemical pulp or paper sheet carried between top and bottom wires running through a dewatering machine having a first dewatering zone, where the top and bottom wires converge in a wedge shape in the wire running direction, the device comprising:

at least one suction box disposed at each of the top and bottom wires downstream of and proximate to the first dewatering zone, each suction box having a suction opening facing a one of the wires, the suction opening of the at least one suction box disposed at the top wire being arranged opposite the suction opening of the at least one suction box disposed at the bottom wire, the suction opening and the wire forming an inlet duct extending opposite to the wire running direction, at least one inlet duct located upstream of a suction opening; and a vacuum source in fluid communication with the suction box.

* * * * *